United States Patent [19]

Hirose

[11] Patent Number: 4,526,443
[45] Date of Patent: Jul. 2, 1985

[54] TELECENTRIC ILLUMINATION SYSTEM
[75] Inventor: Hideo Hirose, Kawaguchi, Japan
[73] Assignee: Nippon Kogaku K.K., Tokyo, Japan
[21] Appl. No.: 418,031
[22] Filed: Sep. 14, 1982
[30] Foreign Application Priority Data Nov. 4, 1981 [JP] Japan ................................ 56-176828

[51] Int. Cl.³ ...................... G02B 13/22; G02B 15/14; G02B 21/06
[52] U.S. Cl. .................................... 350/415; 350/427; 350/523
[58] Field of Search ............... 350/415, 427, 519, 523, 350/524

[56] References Cited

U.S. PATENT DOCUMENTS

| 2,078,586 | 4/1937 | Richter | 350/523 |
| 2,552,238 | 5/1951 | Turner et al. | 350/415 |
| 3,421,808 | 1/1969 | Gottlieb | 350/523 |
| 4,386,828 | 6/1983 | Hirose | 350/427 |

Primary Examiner—John K. Corbin
Assistant Examiner—Rebecca D. Gass
Attorney, Agent, or Firm—Fitzpatrick, Cella, Harper & Scinto

[57] ABSTRACT

A telecentric illumination system for telecentrically illuminating an object includes a light source, optical means for telecentrically supplying a light beam from the light source to the object, and an auxiliary condenser removably disposed between the optical means and the object to be illuminated. The auxiliary condenser has a first and a second lens group disposed with a spacing therebetween corresponding to the sum of the focal lengths thereof. Thus, when the auxiliary condenser is inserted between the optical means and the object to be illuminated, there is achieved a telecentric illumination of higher magnification than the illuminated condition by the optical means.

5 Claims, 4 Drawing Figures

TELECENTRIC ILLUMINATION SYSTEM

BACKGROUND OF THE INVENTION

1. Field of the Invention

This invention relates to a telecentric illumination system which is capable of increasing the magnification changing area on the high magnification side of the telecentric illumination system.

2. Description of the Prior Art

For example, in an illumination system in a projection inspection device or the like, telecentric illumination has heretofore been adopted to minimize the influence of the in-focus error during measurement. To obtain a projection image which is always bright even if the magnification is changed, there has been proposed a variable magnification telecentric illumination system which is capable of changing the illumination area in accordance with a change in magnification of an objective lens as shown in Japanese Patent Application No. 68997/1980 (corresponding U.S. application Ser. No. 263,174, now U.S. Pat. No. 4,386,828) and Japanese Patent Application No. 93729/1981 by the applicant of this application. However, the magnification change ratio of the illumination system is limited and in reality, it is very small as compared with the magnification ratio from the very low magnification to the super-high magnification of a projection lens. Therefore, to secure the brightness at the super-high magnification, it is necessary to increase the magnification changing area on the high magnification side of the telecentric illumination system.

Heretofore, in a telecentric illumination system as shown in FIG. 1 of the accompanying drawings, it has usually been practised to add a convergent lens group L between a condenser lens $L_C$ and an object surface O as shown in FIG. 2 of the accompanying drawings and cause a light source image S' to be formed near the object O to be illuminated and thereby increase the brightness. In this method, however, conditions of telecentric illumination are destroyed and therefore, this method is not preferable for a measuring instrument. Also, if the light source image is brought too close to the object to be illuminated, there will occur numerous inconveniences that the filament is seen and that irregularity of illumination is caused. Therefore, the light source image must unavoidably be spaced to some degree from the object to be illuminated and, as shown in FIG. 2, the marginal light beam cannot be used effectively and the loss of quantity of light is great, and this is inefficient. Also, a projection lens is designed telecentrically, and particularly in the case of a lens having a long working distance, the effective diameter of the fore lens thereof is great and therefore, if an illumination greatly broken from telecentric illumination is effected, light which is not actually utilized for image formation will enter the lens, thus resulting in flare or ghost effects.

It is an object of the present invention to overcome the above-noted disadvantages and to provide a telecentric illumination system which is capable of increasing the magnification changing area on the high magnification side while effectively using the light source and light beam of the telecentric illumination system, thereby effecting bright illumination of higher magnification.

The telecentric illumination system according to the present invention has first and second convergent lens groups disposed with a spacing therebetween corresponding to the sum of the focal lengths thereof, and is inserted in the object side of a predetermined telecentric illumination device to achieve telecentric illumination of higher magnification than the illuminated condition by the predetermined telecentric illumination device.

The invention will become more fully apparent from the following detailed description thereof taken in conjunction with the accompanying drawings.

DESCRIPTION OF THE PREFERRED EMBODIMENT

Figure 1:
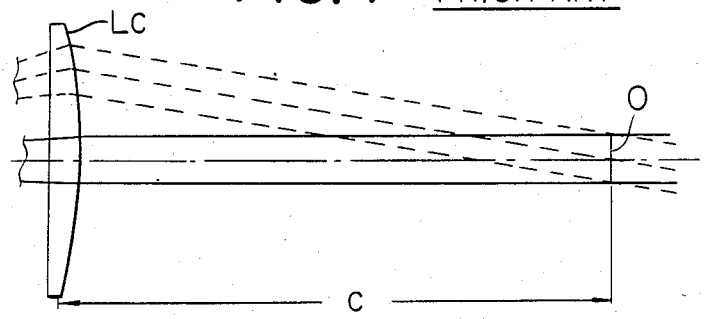
FIGS. 1 and 2 illustrate an example of the auxiliary condenser lens according to the prior art.
Figure 2:
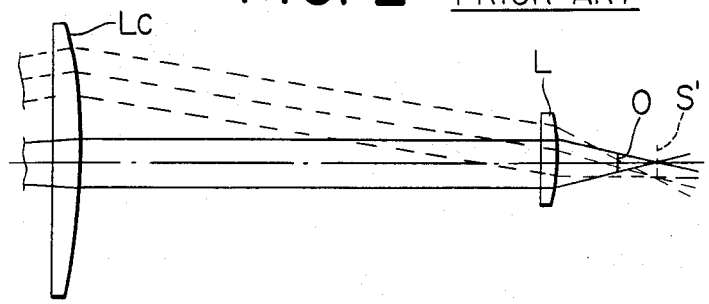
Figure 3:
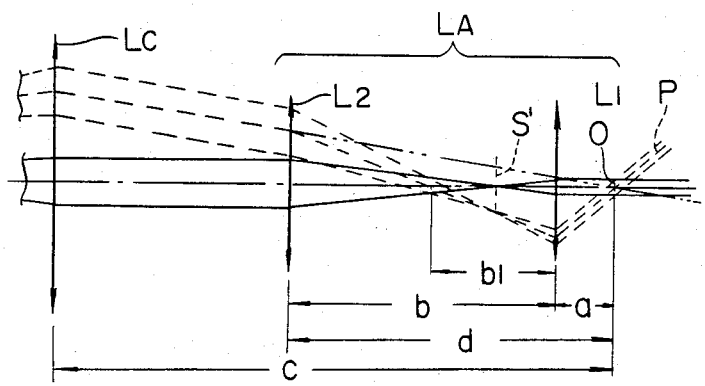
FIG. 3 illustrates the basic construction of the present invention.

The invention will hereinafter be described with reference to the drawings. Referring to FIG. 3, it is an optical path diagram showing the basic construction of the present invention. An auxiliary condenser $L_A$ comprising, in succession from the side of an object O to be illuminated, a convergent first group lens $L_1$ and a convergent second group lens $L_2$ is inserted between the object O to be illuminated and a telecentric illumination lens $L_C$. The conjugate relation with an unshown light source and field stop for telecentric illumination is as follows. The position of the light source is infinity, that is, the portion between the telecentric illumination lens $L_C$ and the object O to be illuminated is a parallel light beam system, and the image of the field stop is formed on the object O to the illuminated. When the auxiliary condenser $L_A$ is inserted, the illumination area is reduced and the illumination aperture is increased while maintaining this condition. For this purpose, when the refractive powers of the first group lens $L_1$ and the second group lens $L_2$ are $f_1$ and $f_2$, respectively, and the spacing between the first group lens $L_1$ and the second group lens $L_2$ is b and the spacing between the first group lens $L_1$ and the object O to be illuminated is a and the spacing between the second group lens $L_2$ and the object O to be illuminated is d and the magnification change ratio as the auxiliary condenser $L_A$ is $\beta$, it is necessary that the following conditions be satisfied with respect to the focal lengths $f_1$ and $f_2$ of the first group lens $L_1$ and the second group lens $L_2$, the spacing b between these lenses $L_1$ and $L_2$, and the spacing a between the first group lens $L_1$ and the object O to be illuminated:

$$1/a + 1/b_1 = 1/f_1 \qquad (1)$$

$$1/(b-b_1) - 1/(a+b) = 1/f_2 \qquad (2)$$

$$b = f_1 + f_2 \qquad (3)$$

$$\beta = f_2/f_1 \qquad (4)$$

$$d = a + b \qquad (5)$$

Equations (1) and (2) satisfy the conjugate relation with the unshown field stop provided in the telecentric illumination system, and $b_1$ represents the distance between the first group lens $L_1$ and the conjugate point of the field stop with respect to the first group lens $L_1$. Equation (3) is concerned with the position of the light source, and equation (4) determines the magnification change ratio as the auxiliary condenser $L_A$. By solving equations (1)-(5), $f_1$, $f_2$, a and b are given by:

$$f_1 = d(\beta-1)/\beta(\beta+1) \quad (6)$$

$$f_2 = d(\beta-1)/(\beta+1) \quad (7)$$

$$a = d/\beta \quad (8)$$

$$b = d(\beta-1)/\beta \quad (9)$$

By constructing the system as described above, the illumination area can be reduced while the conditions of telecentric illumination are maintained as shown in FIG. 3, and the principal light ray P of the oblique light beam passes through the center of the object to be illuminated and the illumination light beam can be effectively used. Further, where there is a field stop and an aperture stop (telecentric stop) in the telecentric illumination system of the main body, even in a condition in which the auxiliary condenser $L_A$ is used, the conjugate relation with respect to the stops is kept invariable and therefore the system can be intactly used. Accordingly, there is an effect similar to that obtained when the magnification change area of the telecentric illumination of the main body is increased.

The auxiliary condenser removably provided in the telecentric illumination system according to the present invention basically assumes the construction of a Kepler type microscope, and it is necessary that this auxiliary condenser satisfy the conditions of equations (6)-(9) with respect to the refractive powers of the respective groups, the spacing therebetween and the positions thereof. When these conditions are not satisfied, the conjugate relations of both of the light source and the field stop of the telecentric illumination of the main body cannot be kept invariable at a time, and a loss of quantity of light and irregularity of illumination occur, and this is not preferable. Also, if setting to values in the vicinity of equations (6)-(9) is possible for a reason concerning the construction, the system can of course be sufficiently used in practice.

Figure 4:
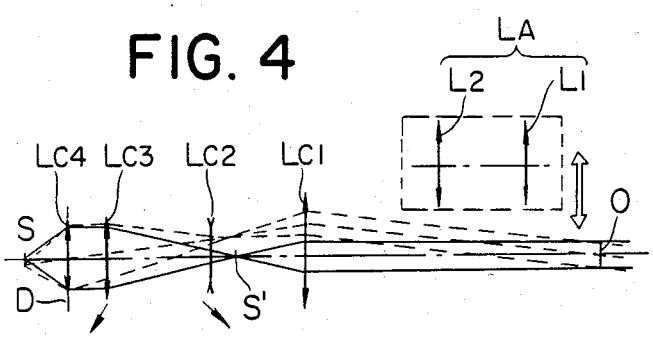
FIG. 4 is an optical path diagram of an embodiment of the present invention.

FIG. 4 is an optical path diagram exemplifying a case where the auxiliary condenser $L_A$ is combined with the telecentric zoom illumination system disclosed in Japanese Patent Application No. 68997/1980 (corresponding U.S. application Ser. No. 263,174, now U.S. Pat. No. 4,386,828). This telecentric zoom illumination system, as shown, has, in succession from the side of the object O to be illuminated, a convergent first group $L_{C1}$, a divergent second group $L_{C2}$ movable along the optical axis, a convergent third group $L_{C3}$ movable along the optical axis, a convergent fourth group $L_{C4}$, and a light source S disposed at the focus position of the fourth group, and the second group $L_{C2}$ and the third group $L_{C3}$ are moved while the image S' of the light source is being formed between the first group $L_{C1}$ and the third group $L_{C3}$, whereby the illumination condition between the illumination for high magnification and the illumination for low magnification can be continuously varied. At that time, the image of the field stop D is always formed on the object O to be illuminated. Thus, the first lens $L_1$ and the second lens $L_2$ are combined integrally with each other in advance, and the auxiliary condenser $L_A$ comprising these is inserted into the object O side. Thus, a telecentric illumination of higher magnification can be added to a zoom type illumination system capable of effecting a wide range of magnification change to thereby enlarge the magnification changing area.

Numerical values regarding the power distributions of the respective groups of the telecentric auxiliary condenser in the present invention will now be shown. It is to be understood that $f_1$ and $f_2$ represent the focal lengths of the first group and the second group, respectively, b represents the spacing between the first group and the second group, a represents the spacing between the first group and the object to be illuminated, d represents the spacing between the second group and the object to be illuminated, and $\beta$ represents the magnification change ratio of the auxiliary condenser.

If $$\beta = 4, d = 88 \text{ mm}$$

are given as the initial conditions, the following various amounts will be obtained from equations (6)-(9):

$$f_1 = 13.2 \text{ mm}, f_2 = 52.8 \text{ mm}$$

$$a = 22 \text{ mm}, b = 66 \text{ mm}$$

Accordingly, if the first lens having a focal length of 13.2 mm and the second lens having a focal length of 52.8 mm are integrally combined with a spacing 66 mm therebetween and this combination is inserted at such a position between the telecentric illumination system of a predetermined magnification and the object to be examined that the distance between the first lens and the surface of the object to be examined is 22 mm, there can be achieved an excellent telecentric illumination of four times higher magnification.

By adding an auxiliary condenser to any telecentric illumination system as described above, the magnification changing area on the high magnification side can be increased, so that even when an objective lens of very high magnification is used, it is possible to obtain a bright and efficient telecentric illumination. Therefore, the projection image can be clearly observed even by the super-high magnification lens of a projection inspection device used in a relatively bright place, and the operability is very much improved. The telecentric illumination system according to the present invention can of course be used not only in a projection inspection device but also in a factory microscope or the like which requires telecentric illumination.

I claim:

1. A telecentric illumination system for telecentrically illuminating an object, comprising:
   telecentrically illuminating optical means having a light source and field stop means for substantially restricting the object field to be illuminated, said optical means supplying a parallel light beam to said object and forming an image of said field stop means on said object, and
   an auxiliary condenser lens means removably disposed between said telecentrically illuminating optical means and said object, said auxiliary condenser lens means having a first convergent lens group and a second convergent lens group disposed with a spacing therebetween corresponding to the sum of the focal lengths thereof, and said auxiliary condenser lens means forming an image of said light source between said first and said second convergent lens groups and maintaining the image of said field stop means on the object when said auxiliary condenser lens means is inserted between said telecentrically illuminating optical means and said object to be illuminated.

2. A telecentric illuminating system according to claim 1, substantially satisfying the following conditions:

$f_1 = d(\beta - 1)/\beta(\beta + 1)$ $f_2 = d(\beta - 1)/(\beta + 1)$ $a = d/\beta$ $b = d(\beta - 1)/\beta$ where $f_1$ and $f_2$ are the focal lengths of said first and second lens groups, respectively, b is the spacing between said first and said second lens group, a is the spacing between said first lens group and said object to be illuminated, d is the spacing between said second lens group and said object to be illuminated, and $\beta$ is the magnification change ratio of said auxiliary condenser lens means.

3. A telecentrically illuminating system according to claim 2, wherein said telecentrically illuminating optical means further includes, in succession from the side of the object to be illuminated, a convergent first main lens group, a divergent second main lens group movable along the optical axis of the system, a convergent third main lens group movable along the optical axis and a convergent fourth main lens group, and wherein, said light source is disposed at the focus position of said fourth main lens group, and said second main lens group and said third main lens group are moved while a primary image of said light source is being formed between said first main lens group and said third main lens group, whereby the illumination condition between an illumination for high magnification and an illumination for low magnification can be continuously varied by the movement of said second main lens group and said third main lens group.

4. A telecentrically illuminating system according to claim 3, wherein said field stop means is disposed near said fourth main lens group.

5. An auxiliary condenser lens assembly to be used in a telecentric illumination system for telecentrically illuminating an object, the system comprising telecentrically illuminating optical means which has a light source and field stop means for substantially restricting the object field to be illuminated, supplies a parallel light beam to said object and forms an image of said field stop means on said object, said auxiliary condenser lens assembly comprising a first convergent lens group and a second convergent lens group disposed with a spacing therebetween corresponding to the sum of the focal lengths thereof, said auxiliary condenser assembly being removably disposed between said telecentrically illuminating optical means and said object, and forming an image of said light source between said first and said second convergent lens groups and maintaining the image of said field stop means on the object when the auxiliary condenser lens means is inserted between said telecentrically illuminating optical means and said object to be illuminated.

* * * * *